United States Patent
Yoshida et al.

(10) Patent No.: US 8,354,815 B2
(45) Date of Patent: Jan. 15, 2013

(54) LINEAR ENCODER, LINEAR MOTOR SYSTEM, AND METHOD OF MANUFACTURING LINEAR ENCODER

(75) Inventors: Yasushi Yoshida, Kitakyushu (JP); Yuji Arinaga, Kitakyushu (JP); Shirou Yoshidomi, Kitakyushu (JP); Yosuke Yamaguchi, Kitakyushu (JP); Jiro Muraoka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 255 days.

(21) Appl. No.: 12/884,495

(22) Filed: Sep. 17, 2010

(65) Prior Publication Data

US 2011/0068731 A1    Mar. 24, 2011

(30) Foreign Application Priority Data

Sep. 18, 2009    (JP) .................. 2009-216377

(51) Int. Cl.
 *G05B 19/29*    (2006.01)
(52) U.S. Cl. .............. 318/602; 250/231.13; 250/231.16; 318/661
(58) Field of Classification Search .................. 318/450, 318/456, 457, 462, 463, 602, 661
See application file for complete search history.

(56) References Cited

U.S. PATENT DOCUMENTS

| | | | | |
|---|---|---|---|---|
| 4,943,716 A * | 7/1990 | Ichikawa et al. | ......... | 250/231.16 |
| 5,537,210 A | 7/1996 | Kaneda et al. | | |
| 7,485,845 B2 * | 2/2009 | Yaku et al. | ............... | 250/231.13 |
| 2007/0102630 A1 * | 5/2007 | Igaki et al. | ............... | 250/231.16 |
| 2008/0258050 A1 * | 10/2008 | Makinouchi et al. | ......... | 250/229 |
| 2009/0135388 A1 * | 5/2009 | Makinouchi et al. | ........... | 355/53 |
| 2010/0243871 A1 * | 9/2010 | Hane | .......................... | 250/231.1 |

FOREIGN PATENT DOCUMENTS

| | | |
|---|---|---|
| JP | 06-347293 | 12/1994 |
| JP | 07-218237 | 8/1995 |
| JP | 09-014916 | 1/1997 |

OTHER PUBLICATIONS

Japanese Office Action for corresponding JP Application No. 2009-216377, Jul. 31, 2012.

* cited by examiner

*Primary Examiner* — Mark Budd

(74) *Attorney, Agent, or Firm* — Ditthavong Mori & Steiner, P.C.

(57) ABSTRACT

An encoder includes: a main scale having two or more band-shaped tracks in each of which an optical main grating is formed so that longitudinal direction of the main scale corresponds to a measurement axis direction; and an index scale opposed to the main scale so as to form a diffraction interference optical system in cooperation with the main grating, disposed so as to be movable relative to the main scale in the measurement axis direction, and in which two or more optical index gratings are formed. A plurality of slits included in the main grating in at least one track are formed so as to be inclined at a predetermined inclination angle from a direction perpendicular to the measurement axis direction so that pitch of the slits in the track becomes equal to the pitch of the slits in the at least one other track.

6 Claims, 8 Drawing Sheets

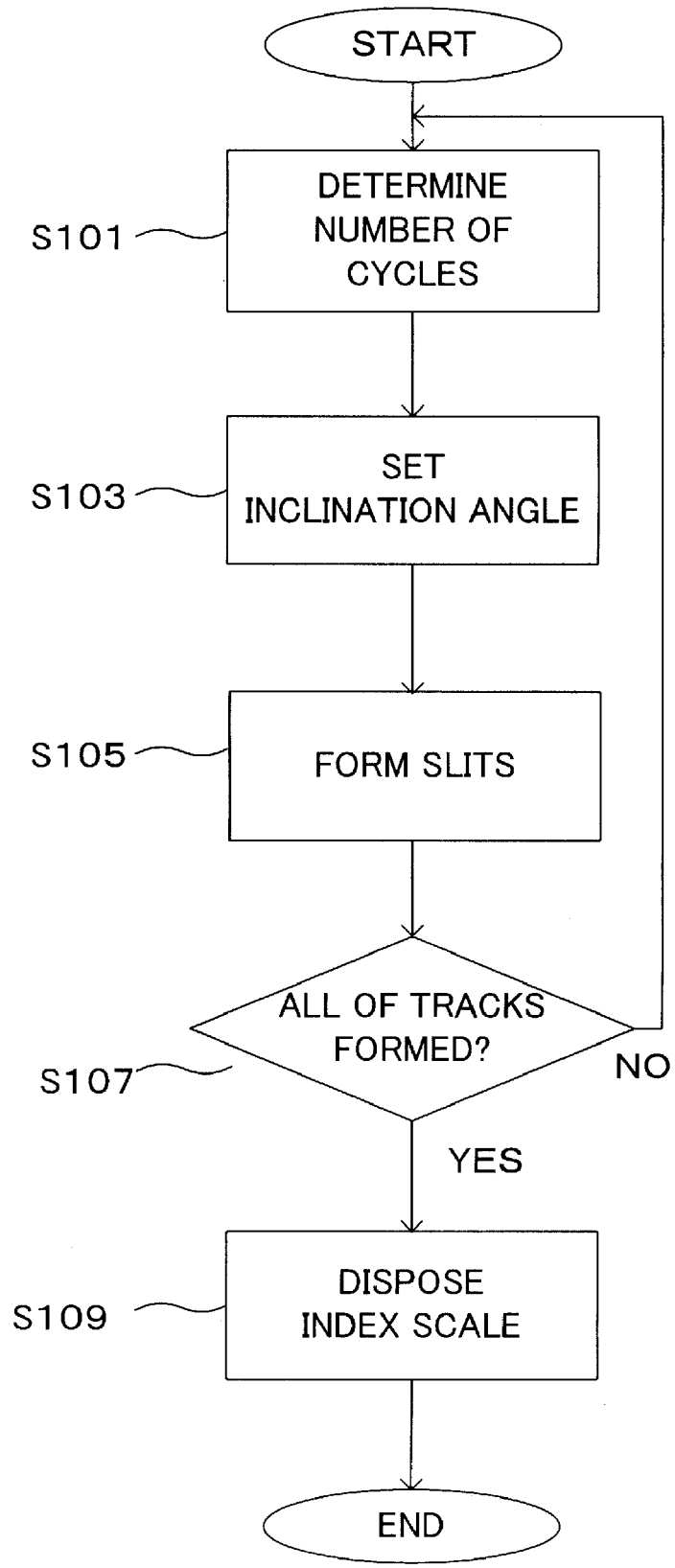

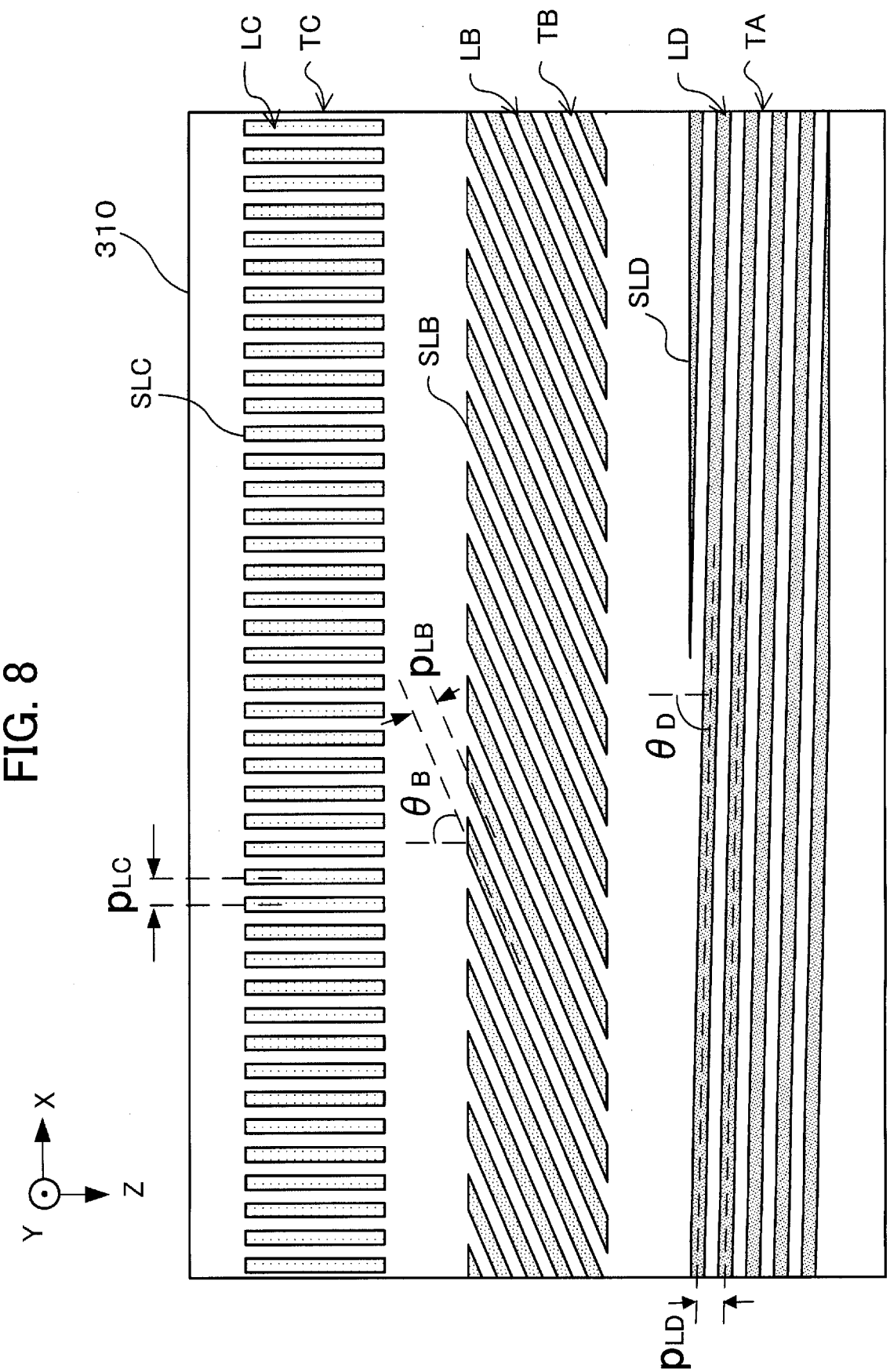

LINEAR ENCODER, LINEAR MOTOR SYSTEM, AND METHOD OF MANUFACTURING LINEAR ENCODER

CROSS-REFERENCE TO RELATED APPLICATIONS

The present application claims priority under 35 U.S.C. §119 to Japanese Patent Application No. 2009-216377, filed Sep. 18, 2009. The contents of this application are incorporated herein by reference in their entirety.

BACKGROUND OF THE INVENTION

1. Field of the Invention

The present invention relates to a linear encoder, a linear motor system, and a method of manufacturing a linear encoder.

2. Description of the Related Art

To measure physical amounts such as the position, velocity, and the like of a mobile body which linearly moves, a linear encoder is used. Encoders are mainly divided into incremental encoders and absolute encoders. The incremental encoder mainly detects a relative position from the original position of a mobile body. Concretely, the incremental encoder detects the original position in advance, obtains a period signal such as a pulse signal according to a movement amount from the original position, and performs a process such as integration on the period signal, thereby detecting the position or the like. On the other hand, the absolute encoder is also called an absolute-value encoder and detects the absolute position of a mobile body.

SUMMARY OF THE INVENTION

Encoders of various detection principles have been developed and each of encoders is properly selected and used according to characteristics required for usage. In particular, the encoder plays an important role, for example, of grasping a present position or the like for a servo motor or the like which performs position control, speed control, or the like. In other words, the performance and characteristics of an encoder which is selected and used for a motor even exert an influence on the performance and characteristics of the motor.

As disclosed in Japanese Unexamined Patent Application Publication Nos. H09-14916 and H06-347293, optical encoders using diffraction interference light formed by a plurality of slits (including a reflection type and a transmission type) have been developed as encoders realizing high resolution. However, in the encoders, a diffraction interference optical system is formed, so that it is difficult to perform miniaturization, designing, development, manufacture, and the like.

The present invention has been achieved in consideration of such problems and an object of the invention is to provide a linear encoder, a linear motor system, and a method of manufacturing a linear encoder realizing miniaturization and facilitated designing, development, manufacture and the like while improving resolution by using diffraction interference light.

To solve the problems, according to an aspect of the present invention, there is provided a linear encoder including: a main scale having two or more band-shaped tracks in each of which an optical main grating is formed so that its longitudinal direction corresponds to a measurement axis direction; and an index scale opposed to the main scale so as to form a diffraction interference optical system in cooperation with the main grating, disposed so as to be movable relative to the main scale in the measurement axis direction, and in which two or more optical index gratings are formed, wherein a plurality of slits included in the main grating in the at least one track are formed so as to be inclined at a predetermined inclination angle from a direction perpendicular to the measurement axis direction so that pitch of the slits in the track becomes equal to the pitch of the slits in the at least one other track.

To solve the problems, according to still another aspect of the present invention, there is provided a linear motor system including:

a motor unit that moves a mobile body along a guide rail;

a linear encoder that measures a position of the mobile body in a measurement axis direction in which the guide rail is extended; and a controller that controls the motor unit based on a position detected by the linear encoder, wherein the linear encoder includes:

a main scale disposed along the guide rail and having two or more band-shaped tracks in each of which an optical main grating is formed so that a longitudinal direction of the tracks corresponds to the measurement axis direction; and an index scale opposed to the main scale so as to form a diffraction interference optical system in cooperation with the main grating, disposed in the mobile body so as to be movable relative to the main scale in the measurement axis direction, and in which two or more optical index gratings are formed, and a plurality of slits included in the main grating in the at least one track are formed so as to be inclined at a predetermined inclination angle from a direction perpendicular to the measurement axis direction so that pitch of the slits in the track becomes equal to the pitch of the slits in the at least one other track.

To solve the problems, according to yet another aspect of the invention, there is provided a method of manufacturing a linear encoder including a main scale having two or more band-shaped tracks in each of which an optical main grating is formed so that longitudinal direction of the main scale corresponds to a measurement axis direction; and an index scale opposed to the main scale so as to form a diffraction interference optical system in cooperation with the main grating, disposed so as to be movable relative to the main scale in the measurement axis direction, and in which two or more optical index gratings are formed, the method including:

a number-of-slits determining step of determining the number of slits which are arranged in the measurement axis direction in a main grating in each of the two or more tracks so as to obtain a desired period signal;

an inclination angle setting step of setting an inclination angle at which the plurality of slits included in the main grating in the at least one track are inclined in a direction perpendicular to the measurement axis direction so that pitch of the slits in the track becomes equal to the pitch of the slits in the at least one other track; and a slit forming step of forming the plurality of slits in the at least one track at the inclination angle.

According to the present invention as described above, a plurality of slits in at least one main grating are provided so as to be inclined so that their pitch becomes equal to the pitch of slits in the other main gratings. As a result, the number of cycles of a period signal obtained from the inclined slits in the main grating can be made smaller than that of a period signal obtained from slits in the other main gratings. In this case, since the pitch can be maintained constant, even if a measurement range becomes relatively long, a period signal of the small number of cycles can be generated, and the absolute position can be detected without providing a detecting mechanism other than a diffraction interference optical system. Meanwhile, as described above, since the pitch can be maintained constant, diffraction interference optical systems for the main gratings can be similarly formed, designing, development, manufacture, and the like can be facilitated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a diagram for explaining a method of manufacturing the linear encoder according to the embodiment; and FIG. 8 is a diagram for explaining the configuration of a main scale of a linear encoder according to the second embodiment of the invention.

DETAILED DESCRIPTION OF THE PREFERRED EMBODIMENTS

Figure 1:
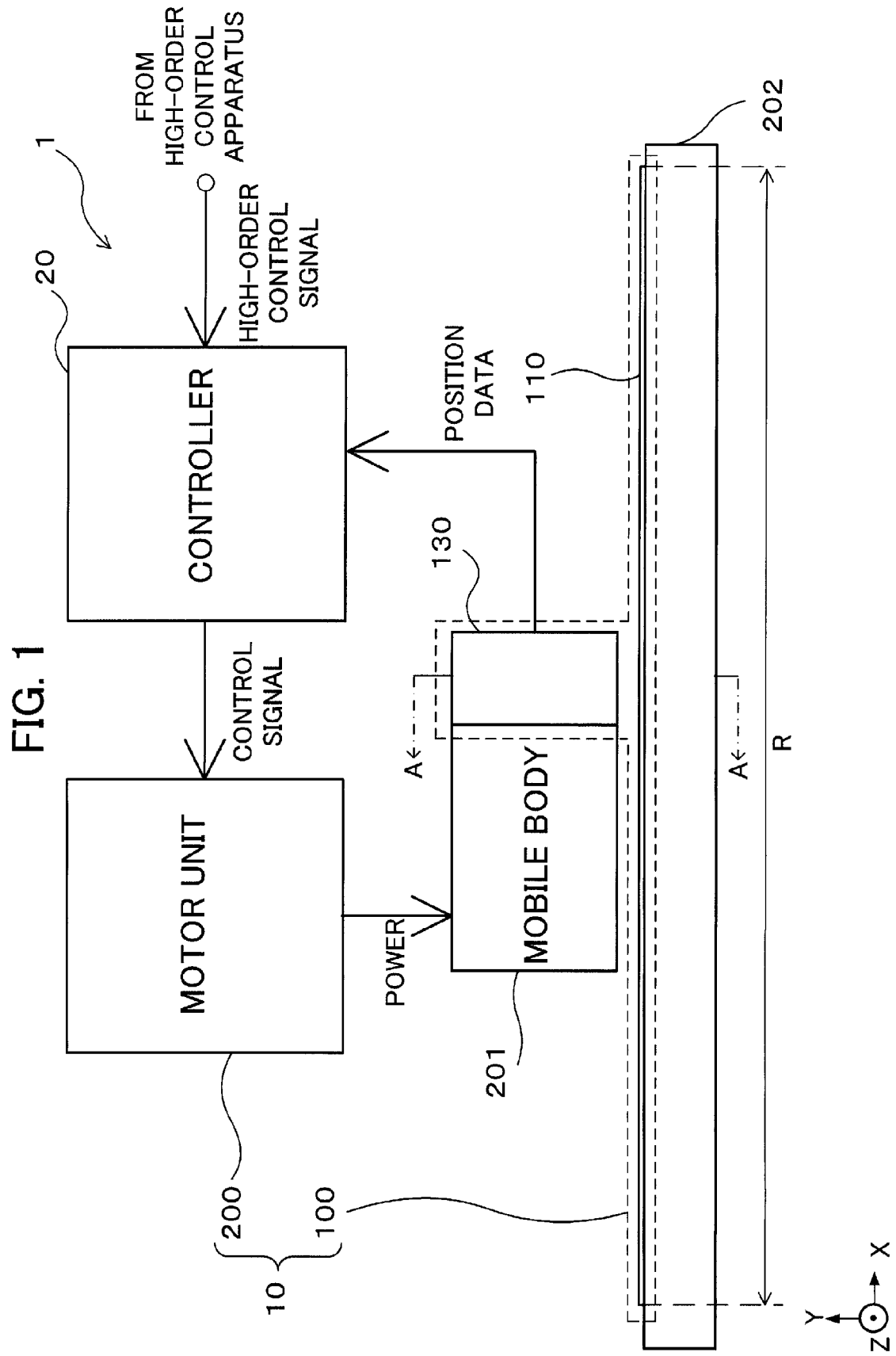
FIG. 1 is a diagram for explaining the configuration of the linear motor system according to the first embodiment of the invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Prior to explanation of the embodiments of the present invention, outline of an optical encoder according to the techniques related to the embodiments will be described. An optical encoder using a grating formed by a plurality of slits (including a reflection type and a transmission type) is developed. Encoders using the optical grating are mainly divided to a "geometric optics type" using light simply passing through or reflected from the grating and a "diffraction interference optical type" using diffraction interference light by the plurality of gratings (refer to, for example, Japanese Unexamined Patent Application Publication Nos. H09-14916 and H06-347293).

A geometric optics encoder receives light reflected by or passed through slits forming a grating without diffraction interference and specifies a positional change or the like by the number of light reception times or the like. The geopetic optics encoder has a characteristic such that, in the case where the slit interval (hereinbelow, also called a "pitch p") in a grating is made constant, the longer the distance between the grating and another grating or a light receiver or the like (hereinbelow, also called a "gap g") becomes, the more the detection precision tends to deteriorate.

On the other hand, in a diffraction interference optical encoder, diffraction interference light by a plurality of gratings is used, and a positional change or the like is specified by the number of times of receiving the diffraction interference light or the like. Therefore, the S/N (Signal to Noise) ratio of the diffraction interference optical encoder can be made higher than that of the geometric optics encoder. Moreover, the diffraction interference optical encoder has a characteristic such that even when the gap "g" is set to be relatively long, it does not easily exert influence on detection precision. It means that the possibility of occurrence of machine interference among the components is reduced, and resistance to environment such as a shock can be improved. As described above, the diffraction interference optical encoder has more advantageous points than the geometric optics encoder.

However, in the diffraction interference optical encoder, a diffraction interference optical system has to be constructed, so that the pitch "p" in each of a plurality of gratings (diffraction gratings) and the gap "g" as an interval of gratings are set to proper values. The relation between the pitch "p" and the gap "g" is a constraint in development and manufacture of the encoder itself. That is, when the pitch "p" or the gap "g" is changed from a proper value, the quality of diffraction interference light deteriorates, and the S/N ratio of a period signal to be detected decreases. On the other hand, to maintain the pitch "p" or the gap "g" to a proper value, a diffraction interference optical system has to be designed/developed in consideration of the periodic number of the period signal (changing corresponding to the number of slits), the formation position of slits, or the like together with the pitch "p" and the gap "g". Therefore, the degree of freedom is low, and design/development is not easy. Since adjustment is necessary for each diffraction interference optical system, manufacture is not also easy.

Particularly, in the case of using a plurality of sets of diffraction interference optical systems in order to obtain a plurality of period signals like an absolute encoder, designing, development, and manufacture have to be performed for each of the sets of the diffraction interference optical systems, so that constraints on the designing, development, and manufacture further increase.

On the other hand, it is more difficult to design and develop an absolute-type linear encoder using a diffraction interference optical system. Concretely, to form a diffraction interference optical system, the pitch in a grating has to be sufficiently short. In the case of forming a linear encoder, a grating has to be formed with a sufficiently short pitch along the entire measurement range of the linear encoder. As a result, it is difficult for the linear encoder having a relatively long measurement range to generate a period signal having a small number of cycles required at the time of forming an absolute encoder. On the other hand, to increase the measurement range, a detecting mechanism other than a diffraction interference optical system has to be provided.

The inventors of the present invention keenly studied such optical encoders and, as a result, invented a linear encoder and the like according to embodiments, enabling detection of an absolute position with the improved detection precision by using diffraction interference light and realizing facilitated designing, development, manufacture, and the like. In the following, embodiments of the present invention will be described in detail.

In each of the embodiments of the invention to be described below, a linear motor system having an absolute linear encoder using diffraction interference light will be described as an example. Specifically, a linear encoder according to any of the embodiments is applied to a linear motor and detects a position "x" in a movement direction (also called a "measurement axis direction") of a mobile body which moves along a straight line by power generated by the linear motor. However, obviously, a linear encoder according to any of the embodiments to be described below can also detect the position "x" of a mobile body which is moved, for example, manually or by another power source such as gravity.

The embodiments of the present invention will be described in the following order for easier understanding.

1 First Embodiment
1-1 Linear Motor System according to First Embodiment
1-2 Linear Encoder according to First Embodiment
1-2-1 Main Scale 110
Tracks TA to TC
Shapes of Slits S
The Number of Slits and the like
1-2-2 Optical Detecting Mechanism
1-2-3 Configuration of Inclined Slit
Inclined Slit in One Track T
Positional Relation between Inclined Slits and Slits on Index Grating Side
Inclined Slits in Relation among a Plurality of Tracks
1-2-4 Position Data generator 140
1-3 Operation of Linear Motor System according to First embodiment
1-4 Method of Manufacturing Linear Encoder according to First Embodiment
1-5 Example of Effect produced by Linear Encoder System according to First Embodiment
2 Second Embodiment
1 First Embodiment
1-1 Linear Motor System According to First Embodiment First, with reference to FIG. 1, the configuration of a linear motor system according to a first embodiment of the present invention will be described. FIG. 1 is a diagram for explaining the configuration of the linear motor system according to the first embodiment of the invention.

As shown in FIG. 1, a linear motor system (hereinbelow, also simply called a "motor system") 1 according to the embodiment provides power for movement to a mobile body 201. As a result, the mobile body 201 moves backward/rearward in directions along a guide rail 202 having an arbitrary shape by the power supplied from the motor system 1. In this case, the motor system 1 does not simply supply a power source to the mobile body 201 but, to control the position "x" of the mobile body 201 with high precision, measures the absolute position "x" of the mobile body 201 in the directions along the guide rail 202 and supplies the power source to the mobile body 201 based on the measured absolute position "x".

The kind, size, and the like of the mobile body 201 which can be moved by the motor system 1 according to the embodiment are not limited. The guide direction of the guide rail 202 for guiding the mobile body 201 (that is, the movement direction of the mobile body) may be straight or curve as long as the guide rail 202 guides the mobile body 201 linearly. Further, the guide direction may have an annular shape such as a circular shape.

In the embodiment, for convenience of explanation, it is assumed that the guide rail 202 guides the mobile body 201 in straight line as shown in FIG. 1. The straight direction in which the guide rail 202 guides the mobile body 201 will be also called a "measurement axis X" or a "measurement axis direction" for a reason that the absolute position "x" in the direction is measured by the motor system 1. That is, in the embodiment, the measurement axis X denotes an axis in straight line as shown in FIG. 1. If the guide direction has a curve or an annular shape, the measurement axis X is a curve axis or an annular axis. Further, for convenience of explanation, one end in the measurement axis X direction will be called "front" or "forward", and the other end in the direction will be called "rear" or "backward".

The mobile body 201 moves along the guide rail 202. The movement range means a range in which the position of the mobile body 201 is measured and will be also called a "measurement range". The length in the direction of the measurement axis X in the measurement range will be called a "measurement range length R".

To control the mobile body 201 with high precision as described above, as shown in FIG. 1, the motor system 1 has a linear motor (hereinbelow, also simply called a "motor") 10 and a controller 20. The motor 10 has a linear encoder (hereinbelow, also simply called an "encoder") 100 as a component of measuring absolute position "x" in the measurement range of the mobile body 201. The motor 10 also has a linear motor unit (hereinbelow, also simply called a "motor unit") 200 as a component of generating power which moves the mobile body 201. The components will be described below.

The motor unit 200 is an example of a power generation source which does not include the encoder 100. The motor unit 200 may be also simply called a motor. The motor unit 200 has a predetermined power generating mechanism (not shown) and a predetermined power transmitting mechanism (not shown). The motor unit 200 generates power by the power generating mechanism and transmits the power to the mobile body 201 by the power transmitting mechanism.

In this case, the power generating mechanism of the motor unit 200 is, although not limited, an electric power generating mechanism using electricity. That is, in the embodiment, the case where the motor unit 200 is an electric motor unit will be described. The motor unit 200 may be a motor unit using another power source such as a hydraulic motor unit, an air motor unit, or a steam motor unit.

In the case of using motors or motor units as the power generating source, they are roughly divided into "rotary" motors and "linear" motors. In the embodiment, in the case where the mobile body 201 moves in a line along the guide rail 202 as a result of transmission of power by the power transmitting mechanism, both of the rotary and linear power generating mechanisms will be called a "linear" power generating mechanisms in a broad sense. That is, the power generating mechanism of the linear motor unit 200 according to the embodiment is not limited to a "linear motor" in a narrow sense such as a magnetically-levitated motor but may be a "rotary motor" or the like that generates rotational force in the case where a power transmitting mechanism which converts rotational force to linear force such as a jackscrew is used. In the following, however, for convenience of explanation, the case where a magnetically-levitated motor is used as the linear motor unit 200 will be described.

The encoder 100 has, broadly, two members. One member is fixed to the guide rail 202, and the other member is fixed to the mobile body 201. The member fixed to the guide rail 202 includes a main scale 110. The member fixed to the mobile body 201 includes an index scale 120 (see FIG. 4). The member fixed to the mobile body 201 and including the index scale 120 will be also called a "moving unit 130".

As described above, the main scale 110 is included in the member fixed to the guide rail 202, and the index scale 120 is disposed in the moving unit 130 fixed to the mobile body 201 while facing the main scale 110 with a gap "g" as a predetermined interval. Therefore, the main scale 110 and the index scale 120 are disposed so as to be capable of moving relative to each other as the mobile body 201 moves. The encoder 100 detects the absolute position "x" of the mobile body 201 by using the relative positional relation between the main scale 110 and the index scale 120. The detection using the relative movement means that by fixing the mobile body 201 and moving the guide rail 202, the position "x" of the guide rail 202 relative to the mobile body 201 is detected.

For convenience of explanation, it is assumed that the encoder 100 according to the embodiment detects the absolute position "x" of the mobile body 201 by detecting the absolute position of the index scale 120 (moving unit 130) in the main scale 110. That is, it is assumed that the absolute position "x" of the index scale 120 with respect to the main scale 110 indicates the absolute position "x" of the moving unit 130 and, further, indicates the absolute position "x" of the mobile body 201. Those positions will be also generically simply called an "absolute position x" or a "position x".

The encoder 100 detects the absolute position "x" and outputs position data indicative of the position "x". The encoder 100 may detect at least one of velocity "v" and acceleration "a" of the mobile body 201 and the like in addition to or in place of the position "x". In this case, the velocity "v" and the acceleration "a" can be detected by a process of differentiating the position "x" with time once or twice or counting a period signal to be described later at predetermined intervals. For convenience of explanation, in the following description, the physical amount detected by the encoder 100 is the position "x".

The disposing positions of the main scale 110 of the encoder 100 and the moving unit 130 are not limited as long as the main scale 110 and the index scale 120 are opposed to each other with the gap "g" therebetween.

The controller 20 obtains position data outputted from the encoder 100 and, based on the position data, controls generation power of the motor unit 200. Therefore, in the embodiment in which an electric motor unit of the electromagnetic levitation type is used as the motor unit 200, the controller 20 controls generation power of the motor unit 200 and controls movement of the mobile body 201 by controlling current, voltage, or the like applied to a wire or the like as a component of the electromagnetic levitation mechanism based on the position data. Further, the controller 20 can also control the motor unit 200 so as to obtain a higher-order control signal from a higher-order control apparatus (not shown) and realize a position, a velocity, or the like expressed by the higher-order control signal with the moving unit 130. In the case where the motor unit 200 uses different power sources such as a hydraulic power source, an air power source, and a steam power source, by controlling supply of these power sources, the controller 20 can control the rotation of the motor unit 200.

1-2 Linear Encoder According to First Embodiment

Figure 2:
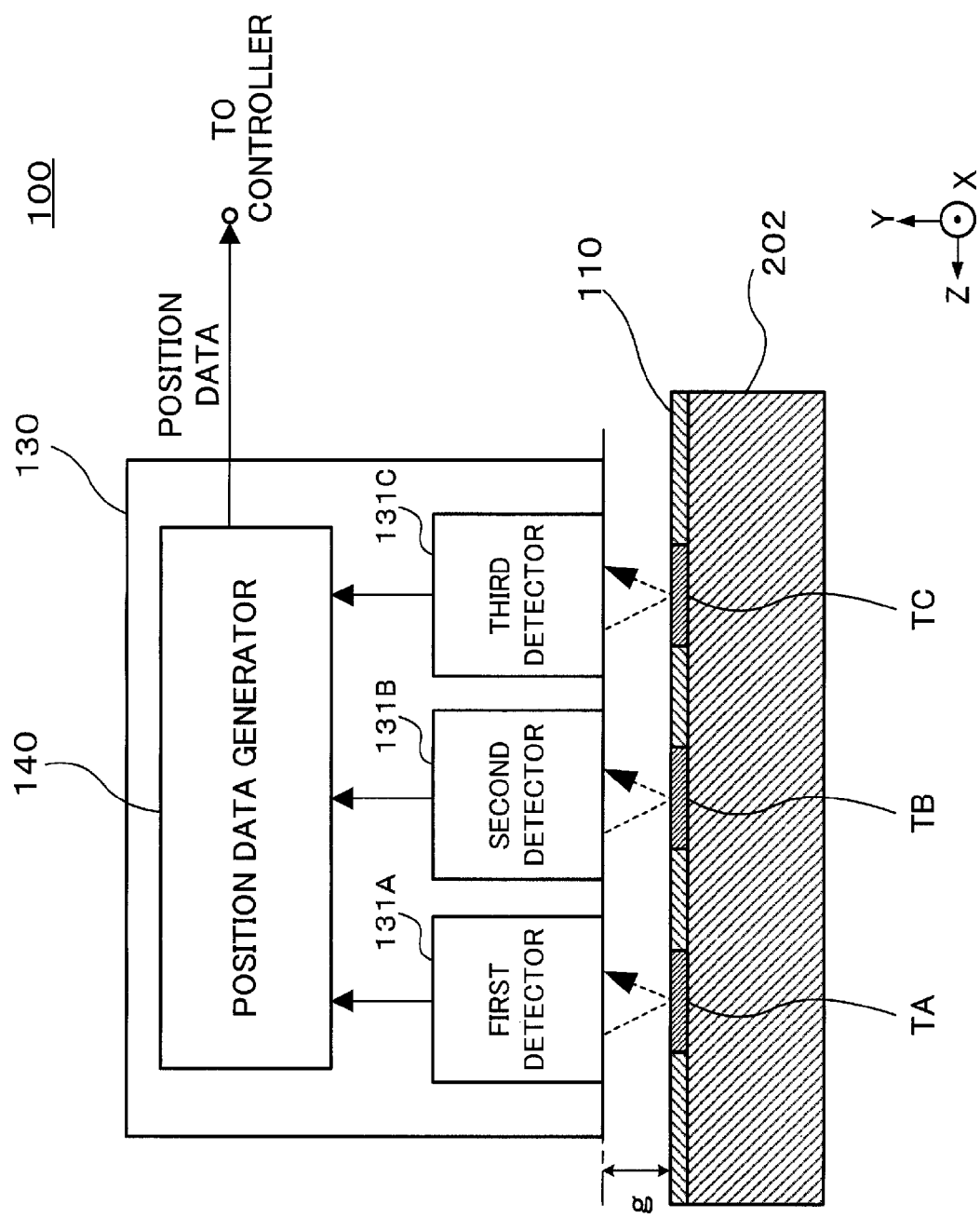
FIG. 2 is a diagram for explaining the configuration of a linear encoder according to the embodiment.
Figure 3:
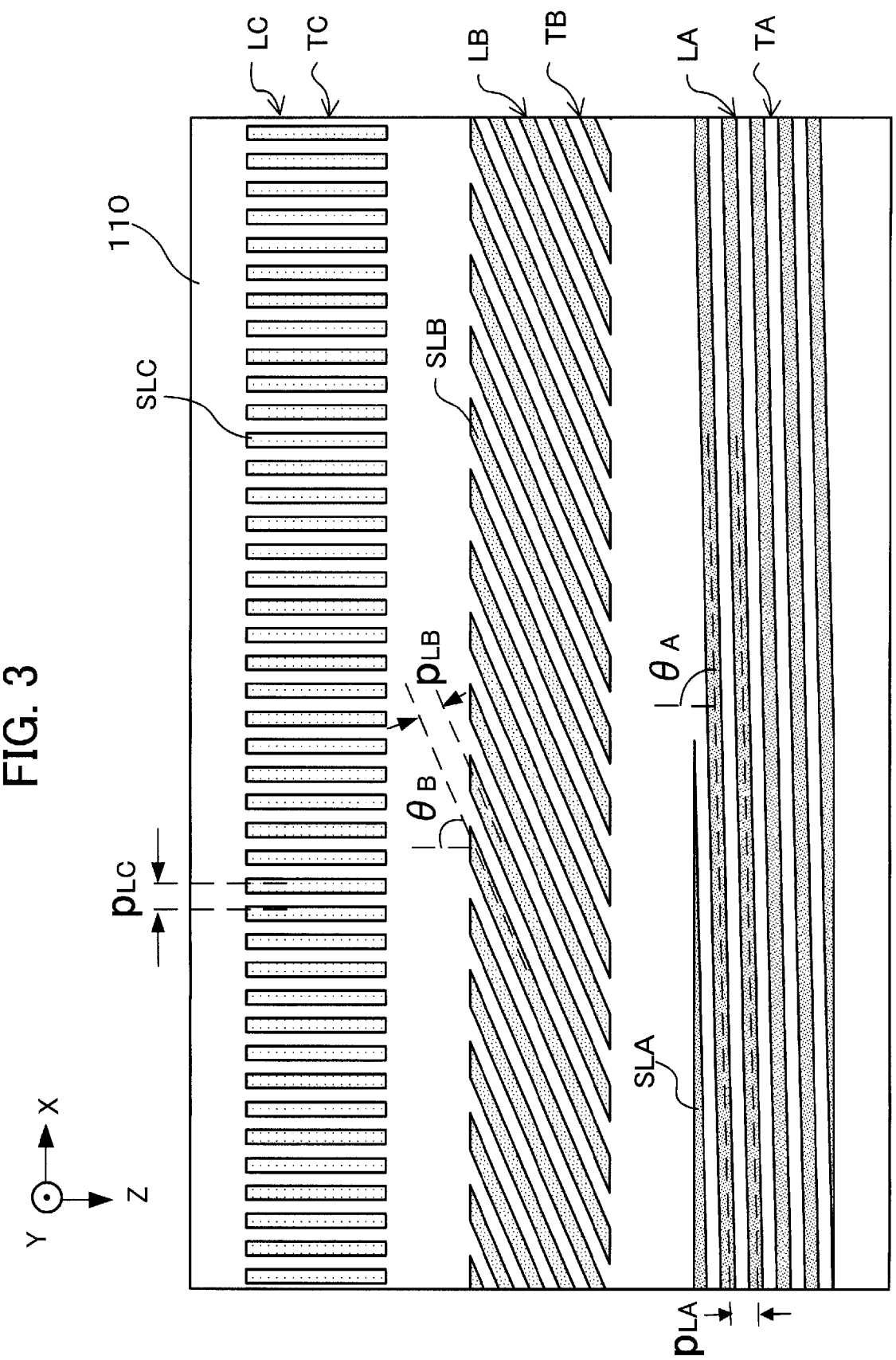
FIG. 3 is a diagram for explaining a main scale of the linear encoder according to the embodiment.

Next, with reference to FIGS. 2 and 3, the configuration of the encoder 100 according to the embodiment will be described. FIG. 2 is a diagram for explaining the configuration of the linear encoder according to the embodiment. FIG. 3 is a diagram for explaining a main scale of the linear encoder according to the embodiment. FIG. 2 is a conceptual cross section taken along line A-A of the encoder 100 shown in FIG. 1. FIG. 3 is a diagram seen from the moving unit 130 side to a face opposed to the moving unit 130, of the main scale 110 of the encoder 100.

As described above, the encoder 100 according to the embodiment has the main scale 110 and the moving unit 130. The moving unit 130 has, as shown in FIG. 2, detectors 131A to 131C and a position data generator 140.

1-2-1 Main Scale 110

As shown in FIG. 1, the main scale 110 is disposed in almost the entire measurement range in the measurement axis X direction along the guide rail 202. Although the example in which the main scale 110 is disposed on the face opposed to the moving unit 130, of the guide rail 202 is shown in FIG. 1, the disposing position of the main scale 110 is not limited as long as the main scale 110 can face the moving unit 130. The main scale 110 does not have to be physically disposed in the entire measurement range but may be disposed in a range in which the measurement range of the position of the mobile body 201 can be measured.

As shown in FIG. 3, the main scale 110 has tracks TA to TC.

Since the encoder 100 according to the embodiment is an absolute encoder, the main scale 110 has three tracks TA to TC in order to precisely detect the absolute position "x" by following the movement of the mobile body 201. The number of tracks T is not limited to three but is properly set to a plurality of pieces in accordance with detection precision required for the absolute value "x" or signal process.

Tracks TA to TC

Each of the tracks TA to TC is formed in a band shape whose longitudinal direction corresponds to the measurement axis X direction. The width in the crosswise direction of each of the band-shaped tracks TA to TC is set to a width in which a diffraction interference optical system to be described later can be formed. The tracks TA to TC are arranged side by side in the "perpendicular axis Z" direction perpendicular to the measurement axis X direction.

As shown in FIG. 3, optical main gratings LA, LB, and LC (optical diffraction gratings which are included in the main scale 110) are formed in the tracks TA, TB, and TC, respectively.

The main gratings LA, LB, and LC have a plurality of optical slits SLA, SLB, and SLC, respectively, and serve as a part of individual diffraction interference optical systems independent of each other for the main gratings LA, LB, and LC.

Each of the slits SLA to SLC is formed so as to reflect light (reflection slit) or transmit light (transmission slit).

In the case where each of the slits SLA to SLC is formed as a reflection slit, the slits SLA to SLC may be formed by a method of vapor-depositing, for example, a material having high reflectance. On the other hand, the portion other than the slits SLA to SLC in the main scale 110 may be formed by a method of, for example, applying a material which absorbs light by deposition or the like or using a material that transmits light for the main scale 110 itself. It is also possible to use a material reflecting light to the main scale 110 itself and process the portion other than the slits SLA to SLC by etching or the like. Further, it is also possible to form the slits SLA to SLC and the portion other than the slits SLA to SLC by a material having high reflectance and, then, form steps in the gap direction in the slits SLA to SLC and the portion other than SLA to SLC, thereby forming slits as a phase diffraction grating.

On the other hand, in the case where each of the slits SLA to SLC is formed as a transmission slit, the main scale 110 itself is made of a material which transmits light. The portion other than the slits SLA to SLC may be formed by a method of, for example, applying a material which blocks light by absorption, reflection, or the like or performing a process of blocking light on the portion other than the slits SLA to SLC. The method of forming the slits SLA to SLC is not limited.

In short, in the case of the reflection-type slits, the slits SLA to SLC reflect light and the other portion does not reflect light.

In the case of the transmission-type slits, the slits SLA to SLC transmit light and the other portion blocks light.

In the embodiment, for convenience of explanation, the case where the slits SLA to SLC in the tracks TA to TC in the main scale 110 are reflection slits will be described below. As described above, in the case where reflection slits are used for the main scale 110, a diffraction interference optical system of the reflection type can be formed. Consequently, as compared with the case where transmission slits are used for the main scale 110, the influence on noise or detection precision due to fluctuations in the gap "g" between the main scale 110 and a index scale 120 which will be described later can be reduced.

The numbers $n_A$ to $n_C$ of the slits SLA to SLC arranged in the measurement axis X direction in the tracks TA to TC are set to numbers different from one another. That is, the numbers $n_A$ to $n_C$ of slits indicate the numbers of the slits SLA to SLC in the case where the slits are counted along the measurement axis X, and the numbers $n_A$ to $n_C$ of slits are set to numbers different from one another. From the tracks TA to TC, period signals of the repetition numbers according to the numbers $n_A$ to $n_C$ of slits are obtained. That is, in the embodiment, three period signals are obtained. The repetition numbers of the three period signals generated when the mobile body 201 moves through the entire measurement range are also called the numbers $m_A$ to $m_C$ of cycles. The numbers $m_A$ to $m_C$ of cycles correspond to resolutions of the tracks TA to TC and of cycles are numbers according to the numbers $n_A$ to $n_C$ of slits, respectively. Therefore, desirably, the numbers $n_A$, $n_B$, and $n_C$ of slits in the tracks TA, TB, and TC are set to numbers according to required resolutions so that the absolute position "x" can be detected with required precision. In the embodiment, the case where the numbers $n_A$ to $n_C$ of slits are set so as to satisfy the relation "$n_A < n_B < n_C$" as shown in FIG. 3 will be described as an example.

In the embodiment, pitches $p_{LA}$, $p_{LB}$, and $p_{LC}$ as intervals of the slits SLA, SLB, and SLC in the tracks TA, TB, and TC are set to almost the same pitch $p_L$ in the tracks TA, TB, and TC ($p_L = p_{LA} = p_{LB} = p_{LC}$). It is sufficient that the pitches $p_{LA}$ to $p_{LC}$ in two or more tracks TA to TC are almost the same, and a track of a different pitch may be included. By setting the pitches $p_{LA}$ to $p_{LC}$ in the plurality of tracks TA to TC to be almost the same, the diffraction interference optical systems in the plurality of tracks TA to TC can be formed similarly, so that designing, development, and manufacture (also described as "manufacture and the like") can be facilitated. In particular, by setting the pitches $p_{LA}$ to $p_{LC}$ in all of the tracks TA to TC to be almost the same as in the embodiment, the manufacture and the like can be largely facilitated. In the embodiment, the expression "pitches $p_{LA}$ to $p_{LC}$" denotes intervals between neighboring slits in the slits SLA to SLC. That is, each of the pitches $p_{LA}$ to $p_{LC}$ denotes a distance between centers in slits.

Shapes of Slits S

The shapes of slits SLA to SLC in the tracks TA to TC will now be described.

In the track TC having the largest number "n" of slits, the plurality of slits SLC are formed so as to extend so that their longitudinal direction corresponds to the perpendicular axis Z direction perpendicular to the measurement axis Z direction. The plurality of slits SLC are disposed so that pitches $p_{LC}$ as intervals of the slits SLC become the same. The slits in such a form will be also called a "perpendicular slits".

On the other hand, in the encoder 100 according to the embodiment, as described above, to enable the pitches $p_{LA}$ to $p_{LC}$ of the plurality of tracks TA to TC to be set to the same pitch $p_L$ and to largely facilitate miniaturization, manufacture, and the like, the plurality of slits SLA in the track TA are disposed parallel to each other, the plurality of slits SLB in the track TB are disposed parallel to each other, and the slits SLA and SLB are formed as "inclined slits" different from perpendicular slits. The slit SLC in the track TC may be formed by an inclined slit. That is, at least any one of the plurality of tracks TA to TC may be formed by inclined slits. In the case where the inclined slits are included, facilitation of adjustment, miniaturization, manufacture, and the like of the pitches $p_{LA}$ to $p_{LC}$ can be realized. The inclined slit will be described in detail later.

The Number of Slits and the Like

The track TA is a part of an example of an "absolute detecting mechanism" for detecting a rough absolute position "x" when the moving unit 130 coupled to the mobile body 201 moves the entire measurement range in the direction of the measurement axis X. The number $n_A$ of slits in the track TA is set to the number by which the absolute position "x" of the moving unit 130 in the direction of the measurement axis X in the entire measurement range can be detected. On the other hand, in the embodiment, the numbers $n_B$ and $n_C$ of slits in the tracks TB and TC are set so as to satisfy "$n_B < n_C$" as described above. Note that, as described above, the numbers $m_A$ to $m_C$ of cycles of period signals obtained from the tracks TA, TB, and TC express position detection precisions in the tracks TA, TB, and TC and correspond to the numbers $n_A$, $n_B$, and $n_C$ of slits, respectively.

In other words, as described above, the absolute detecting mechanism detects the rough absolute position "x" in the entire measurement range.

On the other hand, a detecting mechanism using the track TB can detect the absolute position "x" in a range narrower than the absolute detecting mechanism with precision higher than the absolute detecting mechanism. The detecting mechanism using the track TB is also called a "middle detecting mechanism".

Further, a detecting mechanism using the track TC can detect the absolute position "x" in a range narrower than that in the middle detecting mechanism with precision higher than the middle detecting mechanism. The detecting mechanism using the track TC is also called an "incremental detecting mechanism".

That is, the absolute encoder 100 according to the embodiment processes the detection positions "x" in the absolute, middle, and incremental detecting mechanisms, thereby detecting the absolute position "x" with precision equivalent to the detection precision of the incremental detecting mechanism.

Each of the absolute detecting mechanism, the middle detecting mechanism, and the incremental detecting mechanism has a diffraction interference optical system. Although the numbers $n_A$ to $n_C$ of slits, the shapes of slits, and the like vary in the mechanisms, the diffraction interference optical systems are independent of one another. The mechanisms are similar with respect to the point such that an optical diffraction interference optical system is used as a detection principle. In the following, therefore, the absolute detecting mechanism, the middle detecting mechanism, and the incremental detecting mechanism will be also generically called an "optical detecting mechanisms".

1-2-2 Optical Detecting Mechanism

Figure 4:
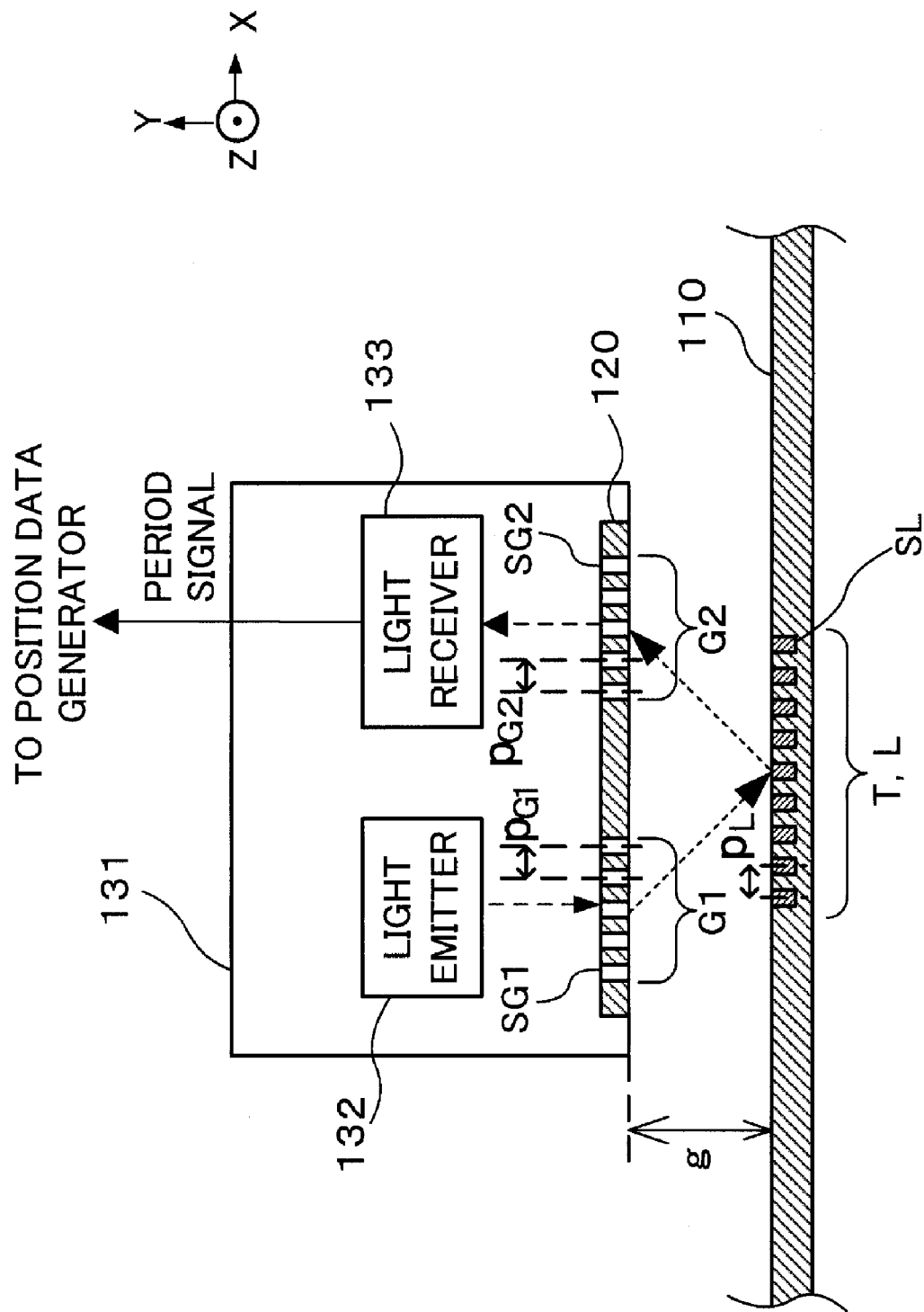
FIG. 4 is a diagram for explaining the optical detecting mechanism of the linear encoder according to the embodiment.

Next, with reference to FIGS. 2 to 4, the optical detecting mechanisms will be described more concretely while explaining the detectors 131A to 131C of the moving unit 130. FIG. 4 is a diagram for explaining the optical detecting mechanism of the linear encoder according to the embodiment.

The detector 131A is disposed so as to face the track TA. The detector 131A and the track TA construct the absolute detecting mechanism. The detector 131B is disposed so as to face the track TB. The detector 131B and the track TB construct the middle detecting mechanism. The detector 131C is disposed so as to face the track TC. The detector 131C and the track TC construct the incremental detecting mechanism.

As described above, the optical detecting mechanisms in the detectors 131A to 131C are common with respect to the point that they have independent diffraction interference optical systems. Therefore, with reference to FIG. 4, one optical detecting mechanism will be described as an example. The different points among the optical detecting mechanisms will be described one by one later.

Accordingly, in the case of describing one optical detecting mechanism as an example, in the following, as shown in FIG. 4, a detector (detectors 131A to 131C), a track (tracks TA to TC), and a main grating (main gratings LA to LC) corresponding to the optical detecting mechanism will be also simply called a "detector 131", a "track T", and a "main grating L", respectively. The slits (slits SLA to SLC) included in the main grating L will be also simply called "slits SL". The pitches ($p_{LA}$ to $p_{LC}$) of the slits SL will be also simply called "pitches $p_L$", the number of slits (the number $n_A$ to $n_C$ of slits) will be also simply called "the number n of slits", and the number of cycles (the number $m_A$ to $m_C$ of cycles) of period signals obtained from the optical detecting mechanism will be also simply called the "number m of cycles".

As shown in FIG. 4, the detector 131 has the index scale 120, a light emitter 132, and a light receiver 133.

The index scale 120 is disposed so as to face the main scale 110 with a gap "g" therebetween. The index scale 120 is made of a material which blocks light and has two optical index gratings G1 and G2 (diffraction gratings formed in the index scale 120) having a plurality of slits SG1 and SG2 that transmit light. That is, the index scale 120 transmits light through the slits SG1 and SG2 in the index gratings G1 and G2, and the index gratings G1 and G2 and the main grating L construct a diffraction interference optical system of three gratings.

In the embodiment, the index gratings G1 and G2 are formed in the same index scale 120. The index gratings G1 and G2 may be formed in different index scales 120. In the case where the index gratings G1 and G2 are formed in different index scales 120, desirably, the distance (gap g) between the index grating G1 and the main grating L and the distance (gap g) between the main grating L and the index grating G2 are equalized on an identical face side of the main scale 110. When the two index gratings G1 and G2 with the same distance from the main grating L are used and reflection-type slits are used for the slits SL in the main grating L, even if the positional relation between the main scale 110 and the detector 131 fluctuates, the gaps "g" between the main grating L and index gratings G1 and G2 are always constant. Therefore, the influence of fluctuations in the gap "g" exerted on the diffraction interference optical system can be reduced.

The relations of the gaps "g" with respect to the detectors 131A to 131C in the optical detecting mechanisms will now be described.

In the embodiment, the pitches $p_{LA}$, $p_{LB}$, and $p_{LC}$ of the slits SLA, SLB, and SLC in the tracks TA, TB, and TC are almost equal to one another and are set to the same pitch $p_L$. Consequently, the gaps "g" between the detectors 131A, 131B, and 131C and the tracks TA, TB, and TC, that is, the main scale 110 can be set almost equal to one another. That is, in the embodiment, the gaps "g" between the main grating LA and the index gratings G1 and G2 corresponding to the main grating LA, the gaps "g" between the main grating LB and the index gratings G1 and G2 corresponding to the main grating LB, and the gaps "g" between the main grating LC and the index gratings G1 and G2 corresponding to the main grating LC are set to be almost equal as shown in FIG. 2.

In the case of such setting, the diffraction interference optical systems according to the gap "g" with respect to the detectors 131A to 131C can be commonly designed and developed, and the gaps "g" at the time of manufacture can be adjusted simultaneously for the detectors 131A to 131C. Therefore, manufacture and the like can be facilitated. Since the gaps "g" of the detectors 131A to 131C are set equal to one another, by integrally forming the index scale 120 of the detectors 131A to 131C shown in FIG. 4 and integrally constructing the detectors 131A to 131C, the manufacture and the like can be further facilitated.

Obviously, such effects are produced similarly only by equalizing the gaps "g" between any two main gratings out of the main gratings LA, LB, and LC (for example, one track and another track) and the index gratings G1 and G2 corresponding to the two main gratings. The optical detecting mechanisms with the equalized gaps "g" are desirably optical detecting mechanisms in which the pitches $p_L$ of the tracks T are set to be equal.

While describing the light emitter 132 and the light receiver 133, each of the index gratings G1 and G2 will be described.

The light emitter 132 has a light source and applies light toward the index grating G1 in the index scale 120. The wavelength and intensity of light applied from the light emitter 132 are not limited but may be properly determined according to the characteristics of the diffraction interference optical system, required positional resolution, and the like. As emission light, diffusion light is used in the embodiment. By using the diffusion light, each of the slits SG1 in the index grating G1 which will be described later can be regarded as an almost line light source, and the diffraction interference effect can be increased. When the slits SG1 can be regarded as almost line light sources, parallel light, laser light, converging light, or the like can be used as emission light. Obviously, the light emitter 132 may have predetermined optical elements such as a diffusion lens according to the characteristics and the like of light used such as parallel light, laser light, converging light, or diffusion light.

The index grating G1 is formed in a position where light applied from the light emitter 132 is incident. The index grating G1 has a plurality of slits SG1 of the transmission type and makes incident light diffracted by the plurality of slits SG1. As a result, each of the slits SG1 can convert light applied to the main scale 110 to light using the slit SG1 as an almost line light source.

The pitch $p_{G1}$ of the plurality of slits SG1 in the index grating G1 is set to satisfy the relation "$p_{G1}=i \times p_L$ (i=1, 2, 3, ...)" where $p_L$ denotes the pitch of the plurality of slits SL in the main grating L. However, in particular, in the case of "i=1, 2", the intensity of a period signal obtained can be often made higher. Specifically, in the case of "i=2", the intensity of a period signal can be often made higher than "i=1". On the other hand, the number "m" of cycles of the period signal changes according to not only the number "n" of slits but also "i". Concretely, in the case of "i=1, 2", the number "m" of cycles becomes at least "m=2×n/i". In the following, for convenience of explanation, the case where "i=2", that is, "$p_{G1}=2p_L$" and "m=n" will be described.

Light passed through the index grating G1 spreads in the width direction of the index grating G1 in accordance with the incidence angle at the time of entering the index grating G1. Therefore, desirably, the width of the slit SL in the main grating L is set to be greater than that of the slit SG1 in the index grating G1 in order to improve signal intensity in consideration of the spread angle. At this time, by setting the width of the slit SL in the main grating L to be greater or smaller than a width by which it is expected that light passed through the index grating G1 reaches, stability of a signal against an error in mounting between the index grating G1 and the main grating L can be further improved.

Similarly, light reflected by the main grating L spreads in the width direction of the main grating L in accordance with the incidence angle at the time of entering the main grating L. Therefore, desirably, the width of the slit SG2 in the index grating G2 which will be described later is also set to be greater than that of the slit SL in the main grating L in order to improve signal intensity in consideration of the spread angle. At this time, by setting the width of the slit SL in the index grating G2 to be greater or smaller than a width by which it is expected that light reflected by the main grating L reaches, stability of a signal against an error in mounting between the index grating G2 and the main grating L can be similarly further improved.

Note that obviously, the relation of widths of slits in the index gratings G1 and G2 and the main grating L is not limited when sufficient signal intensity can be assured and the stability of a signal against a mounting error can be also sufficiently assured.

Desirably, the plurality of slits SG1 in the index grating G1 are formed almost parallel to the slits SL in the opposed positions in order to increase the diffraction interference effect of the diffraction interference optical system formed together with another main grating L and the index grating G2 and to reduce noise.

Since the slits SLA and SLB in the main gratings LA and LB are inclined slits as shown in FIG. 3, desirably, the plurality of slits SG1 and SG2 in the index gratings G1 and G2 of the detectors 131A and 131B are formed as inclined slits so as to be parallel to the opposed inclined slits. On the other hand, since the slits S in the main grating LC are perpendicular slits, desirably, the plurality of slits SG1 and SG2 in the index gratings G1 and G2 in the detector 131C are formed as perpendicular slits so as to be parallel to the opposed perpendicular slits.

Different from the inclined slits in the tracks TA and TB, the inclined slits in the detectors 131A and 131B can be formed by simply disposing a detector similar to the detector 131C having the perpendicular slits about the normal axis Y in the direction normal to the measurement face of the main scale 110 so as to be rotatable in correspondence with the inclined slits in the tracks TA and TB. Therefore, the same detector as the detectors 131A to 131C can be used, so that manufacture and the like can be further facilitated and, moreover, the manufacture cost can be also reduced.

As shown in FIG. 4, light diffracted by the index grating G1 is applied to the main grating L corresponding to the index grating G1. The light applied to the main grating L is reflected by the slits SL in the main grating L. In this case, the light reflected is further diffracted by the main grating L. The light diffracted by the main grating L is applied to the index grating G2.

The index grating G2 is formed in the position where the light diffracted by the main grating L is incident. The pitch $p_{G2}$ of the slits SG2 in the index grating G2 is set to be the same as the pitch $p_{G1}$ of the slits SG1 in the index grating G1. That is, in the embodiment, "$p_{G1}=p_{G2}=2\times p_L$". The shape of the slit SG2, the positional relation of the slit SG2 with respect to the slit SG1 in the index grating G1, and the like are similar to those of the slit SG2 in the index grating G1. The detailed description will not be therefore repeated.

Figure 5:
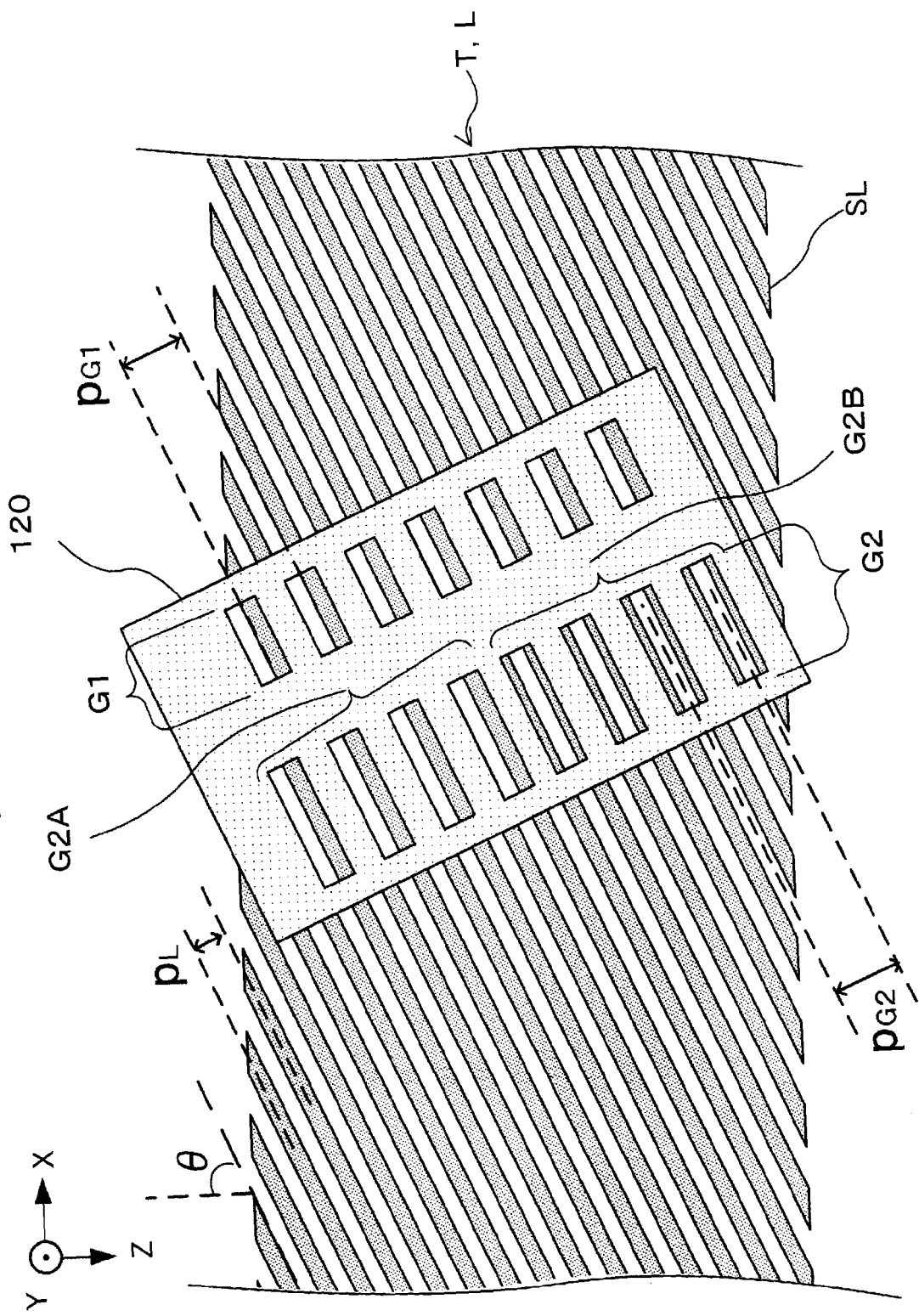
FIG. 5 is a diagram for explaining inclined slits of the linear encoder according to the embodiment.

The index grating G2 is, different from the index grating G1, divided in two or more regions (for example, regions G2A and G2B shown in FIG. 5). The slits SG2 are formed at the same pitch $p_{G2}$ in each of the regions, and the slits in the regions are deviated by "$p_{G2}/4$". For convenience of explanation, in the following, the case where the index grating G2 is divided in two regions G2A and G2B as shown in FIG. 5 will be described.

On the other hand, as shown in FIG. 4, the light diffracted by the main grating L is applied to the index grating G2. The light which is applied to the index grating G2 is in an interference pattern in which light diffracted by the plurality of slits SL in the main grating L interfere each other. The positions in light parts in the interference pattern shift according to changes in the positional relation between the index grating G1 and the main grating L when the main scale 110 moves. As a result, intensity of light passing through the slits SG2 in the regions G2A and G2B shifted by "$p_{G2}/4$" shifts by 90° and increases/decreases in a sine wave shape.

The light receiver 133 is disposed so as to receive the light passed through the slits SG2 in the index grating G2. The light receiver 133 has, for example, light receiving elements such as photodiodes and converts intensity of received light to an electric signal. In this case, the light receiver 133 has, for example, two light reception faces so that electric signals can be differently generated for the regions G2A and G2B.

An electric signal generated by the light receiver 133 becomes an electric signal having an almost sine wave shape at predetermined intervals (also called a "period signal") which is repeated each time the main scale 110 moves only by an amount corresponding to the pitch p or the like. On the other hand, the period signals corresponding to the regions G2A and G2B are two period signals whose phases are out from each other by 90° similar to the intensities of light passing through the slits SG2 in the regions G2A and G2B.

The two period signals will be called an "A-phase period signal" and a "B-phase period signal". Two period signals obtained in each of the absolute detecting mechanism, the middle detecting mechanism, and the incremental detecting mechanism will be called an "absolute signals", "middle signals", and "incremental signals", respectively.

As described above, in the optical detecting mechanism, a diffraction interference optical system of three gratings is constructed. Therefore, when an interference occurs due to the relations with the pitches $p_L$, $p_{G1}$, and $p_{G2}$ regardless of the size of the gap "g", a desired period signal can be detected.

In a geometric optics encoder, light passed through the slits $S_L$ is simply received. Consequently, the larger the gap "g" is formed, the more noise increases due to the influence of light on a diffraction component and a diffusion component, so that the gap "g" has to be made small. In contrast, in a diffraction interference optical system as described in the embodiment, the gap "g" between a fixed member and a rotating member can be made large. As a result, the degree of freedom of designing and development can be increased, and an inconvenience that the fixed member and the moving member interfere each other due to an impact or the like can be reduced.

As described above, although the diffraction interference optical system of three gratings (the main grating L and the index gratings G1 and G2) is described as an example in the embodiment, the invention is not limited to the system. For example, by using a band-shaped light receiving element having a light reception face in the position of each of the slits SG2 in the index grating G2 in place of the index grating G2, a pseudo diffraction interference optical system of three gratings can be formed. Further, by using a band-shape or linear light emitting element or the like that emits light in the position of each of the slits SG1 in the index gating G1 in place of the index grating G1, a pseudo diffraction interference optical system of three gratings can be also formed. Obviously, if a similar diffraction interference optical system can be constructed, the number of gratings is not limited.

1-2-3 Configuration of Inclined Slit

The configuration of the linear encoder 100 according to the first embodiment of the invention has been described above. Referring now to FIG. 5, the inclined slits used for the main gratings LA and LB will be described in detail. FIG. 5 is a diagram for explaining inclined slits of the linear encoder according to the embodiment.

Inclined Slit in One Track T

First, with reference to FIG. 5, one of inclined slits, that is, the slit SLA in the main grating LA in the track TA or the slit SLB in the main grating LB in the track TB will be described as an example. The different points between the slits SLA and SLB will be described individually.

The slits SL in the main grating L according to the embodiment are arranged in the band-shaped track T. As described above and as shown in FIG. 5, at least one slit SL in the main grating L is formed as an inclined slit different from a perpendicular slit.

The slits SL formed as inclined slits (here simply called "slits SL") are formed so as to extend so that the direction of inclination at a predetermined inclination angle θ from the perpendicular axis Z direction perpendicular to the measurement axis X direction corresponds to the longitudinal direction of the slits SL as shown in FIG. 5. The plurality of slits SL are disposed in parallel so that the pitches $p_L$ as the intervals between the slits SL become the same. In the description, the inclination angle θ in one inclination direction as shown in FIG. 5 is positive, and the angle θ with respect to an inclination direction opposite to the one inclination direction in the measurement axis X direction is negative. In other words, in FIG. 5, the slits SL are formed so that the direction obtained by turning the perpendicular axis Z clockwise by the positive inclination angle θ becomes the longitudinal direction. On the other hand, in the case of the negative inclination angle θ, the slits SL are formed so that the direction obtained by turning the perpendicular axis Z counterclockwise by the absolute value of the inclination angle θ becomes the longitudinal direction.

Various formation examples of such inclined slits can be considered. A formation example of the slit SL will be described as follows.

The slits SL are formed so that their longitudinal direction becomes a direction inclined by a predetermined angle θ from the perpendicular axis Z. The slits SL are disposed along the measurement axis X direction by the number "n" of slits so that the pitch $p_L$ of the slits SL becomes constant.

As described above, in the case where "i=1", that is, "$p_{G1}=2p_L$" and "m=n", to obtain a period signal of the number "m" of cycles, the inclined slits are formed as follows. First, the number "n" of slits is determined from "m=n". In the embodiment, the pitch $p_L$ is set to the same value as the pitch $p_L$ in another track T. Consequently, when the inclination angle θ of the slits SL is properly set, the pitch $p_L$ is adjusted to a desired value. For example, the inclination angle θ is set so as to satisfy the following equation 1.

$$\theta = \arccos((R/n)/p_L) \quad \text{Expression 1}$$

The slits SL of the n pieces are arranged in the measurement axis X direction with a predetermined width so that their longitudinal direction becomes the direction of the inclination angle θ and the intervals of the slits SL are constant at the pitch $p_L$. In this case, a distance $p_X$ between the slits in the measurement axis X direction is set to satisfy the following expression 2.

$$p_X = p_L \times \cos(\theta) = R/n \quad \text{Expression 2}$$

Further, generally, in the diffraction interference optical system, the optimum gaps "g" between the main grating L and the index gratings G1 and G2 depends on wavelength λ of light applied from the light emitter 132 and the pitch $p_L$ of the plurality of slits SL in the main grid L. For example, in the optical system of three gratings, when k is a positive integer, in the case of $p_{G1}=p_L=p_{G2}$, the gap "g" becomes optimum when the following expression 3 is satisfied. In the case of $p_{G1}=2 \times p_L=p_{G2}$, the gap "g" becomes optimum when the following expression 4 is satisfied.

$$g = (2 \times k - 1) \times p_L^2 / 4\lambda \quad \text{Expression 3}$$

$$g = (2 \times k) \times p_L^2 / \lambda \quad \text{Expression 4}$$

On the other hand, in the case of forming an absolute encoder by using a diffraction interference optical system, a plurality of tracks T of different numbers "n" of slits are required to obtain a plurality of period signals of different number "m" of cycles. If all of a plurality of tracks T are formed as perpendicular slits, the pitch $p_L$ of the tracks T becomes "$p_L = R/n$" and varies among tracks. As a result, the gap "g" with respect to the tracks T varies, so that the gap "g" and the like have to be designed and developed for each of the diffraction interference optical systems of the tracks T.

In contrast, the pitch $p_L$ of the plurality of inclined slits SL as in the embodiment is expressed as expression 5 from expression 2.

$$p_L = (R/n)/\cos(\theta) \quad \text{Expression 5}$$

Therefore, only by properly setting the inclination angle θ while maintaining the number "n" of slits (i.e., corresponding to the period of the period signal) to a desired value (value corresponding to the number "m" of cycles), the pitch $p_L$ can be set to an optimum value so as to construct a diffraction interference optical system. As a result, the number "n" of tracks can be freely set, so that designing, development, and the like are facilitated.

The formation example of the inclined slits as described above, the expression, and the like are just examples, and such expressions do not have to be used. That is, as described above, as long as the slits inclined from the perpendicular axis Z direction as described above are formed, the formation method, the designing method, and the like are not limited.

Positional Relation Between Inclined Slits and Slits on Index Grating Side

Only by disposing the index gratings G1 and G2 having a configuration similar to that of the case of perpendicular slits so as to be turned about the normal axis Y only by the inclination angle θ, inclined slits can be formed. As a result, as shown in FIG. 5, the index gratings G1 and G2 are disposed so that the slits SL in the corresponding main grating L and the slits SG1 and SG2 become parallel to each other.

Inclined Slits in Relation Among a Plurality of Tracks

The inclined slit in one track T has been described above. Now, inclined slits in the relation of the plurality of tracks TA and TB will be described with reference to FIGS. 2 and 3. The inclination angles θ of the tracks TA and TB will be called "inclination angles $\theta_A$ and $\theta_B$", respectively.

In the embodiment, as shown in FIG. 2, the gaps "g" between the main gratings LA to LC of all of the tracks TA to TC and the index scale 120 of the detectors 131A to 131C are set almost equally. On the other hand, to form a diffraction interference optical system, it is important to realize the pitch $p_L$ of the slits SL corresponding to the gaps "g" so as to satisfy the expression 3 or 4.

In the embodiment, the inclination degree $\theta_A$ in the slit SLA of the track TA is set so that, as shown in FIG. 3, the pitch $p_{LA}$ of the slit SLA becomes equal to the pitch $p_{LC}$ of the slit SLC in another track TC. Further, the inclination degree $\theta_B$ in the slit SLB of the track TB is also set so that, as shown in FIG. 3, the pitch $p_{LB}$ of the slit SLB becomes equal to the pitch $p_{LC}$ of the slit SLC in another track TC.

On the other hand, the number $n_A$ of slits in the track TA is different from the number $n_B$ of slits in the track TB ($n_A < n_B$). Therefore, as understood also from the expression 5, the inclination angle $\theta_A$ in the track TA is set so as to be different from the inclination angle $\theta_B$ in the track TB ($\theta_A > \theta_B$). Thus, the pitch $p_{LA}$ in the track TA and the pitch $p_{LB}$ in the track TB in the neighboring inclined slits can be made almost equal to each other.

As a result, the pitches $p_{LA}$ to $p_{LC}$ of the slits SLA to SLC in all of the tracks TA to TC can be made almost uniform. Therefore, the detectors 131A to 131C can be disposed with the uniform gap "g" while forming the diffraction interference optical systems. In this manner, in the case where the plurality of detectors 131A to 131C can be formed with the uniform gap "g", adjustment in the gap "g" direction of the detectors 131A to 131C is facilitated and, moreover, the detectors 131A to 131C can be also integrally formed. In the case where the detectors 131A to 131C are integrally formed, their index scale 120 may be formed integrally as a single index scale. In this case, the degree of freedom in designing and the like is improved and manufacture can be facilitated.

1-2-4 Position Data Generator 140

Figure 6A:
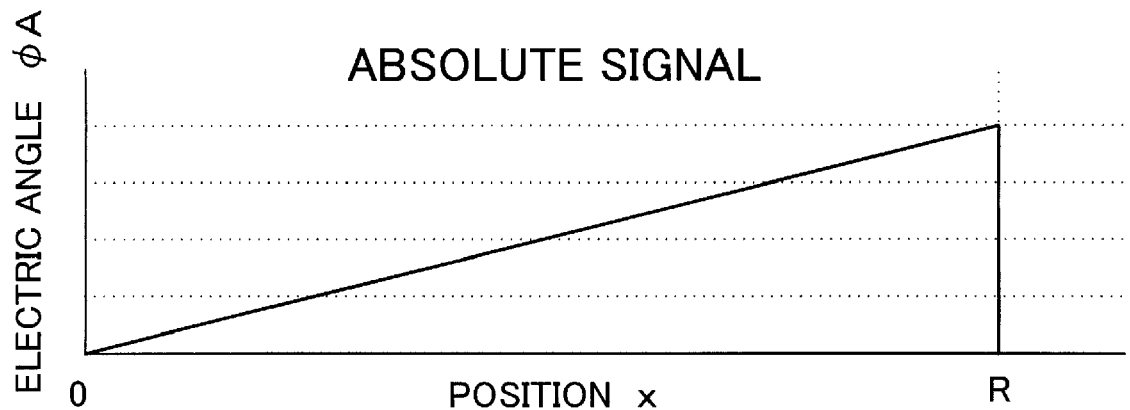
FIG. 6A is a diagram for explaining a position data generator of the linear encoder according to the embodiment.
Figure 6B:
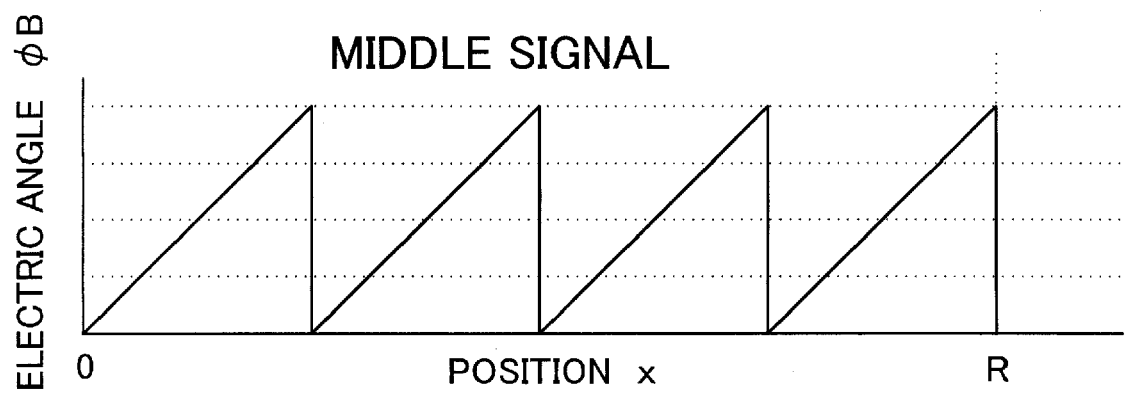
FIG. 6B is a diagram for explaining the position data generator of the linear encoder according to the embodiment.
Figure 6C:
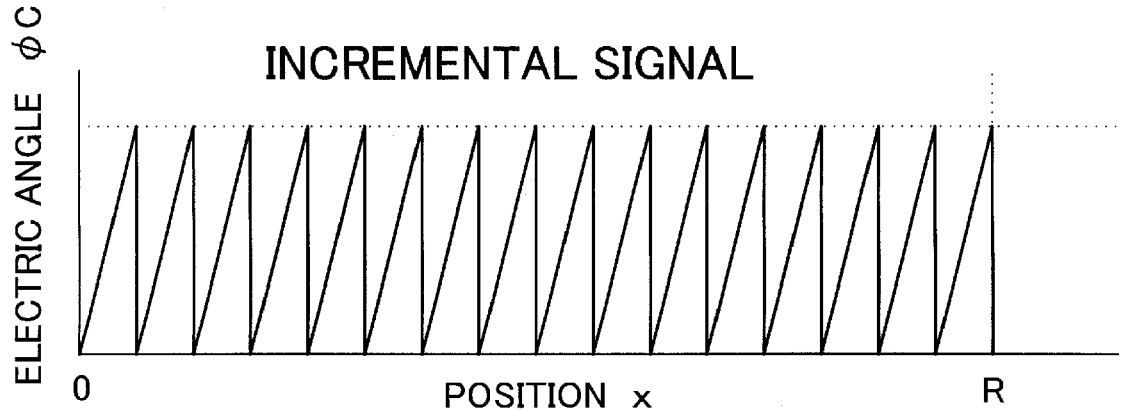
FIG. 6C is a diagram for explaining the position data generator of the linear encoder according to the embodiment.

Next, the position data generator 140 as an undescribed component in the encoder 100 will be described with reference to FIG. 2 and FIGS. 6A to 6C. FIGS. 6A to 6C are diagrams for explaining the position data generator of the linear encoder according to the embodiment.

The position data generator 140 obtains an absolute signal, and a middle signal, and an incremental signal each having a sine wave shape from the detectors 131A, 131B, and 131C. The position data generator 140 specifies the absolute position "x" of the motor unit 200 from those signals and outputs position data indicative of the position "x". In the following, an example of a process of specifying the position "x" by the position data generator 140 will be described more concretely.

Each of the absolute signal, the middle signal, and the incremental signal includes, as described above, in the embodiment, two period signals of an A-phase period signal and a B-phase period signal whose phases are out by 90°. The position data generator 140 obtains two sine-wave signals of the A-phase and the B-phase with respect to each of the absolute signal, the middle signal, and the incremental signal. The position data generator 140 generates a signal which monotonically increases in each cycle (or a signal which monotonically decreases, also called a "monotonic increase signal" below) by performing a multiplying process or the like on the two sine-wave signals of the A and B phases for each of the absolute signal, the middle signal, and the incremental signal.

In the following, a monotonic increase signal obtained by processing the absolute signal will be also simply called an absolute signal, a monotonic increase signal obtained by processing the middle signal will be also simply called a middle signal, and a monotonic increase signal obtained by processing the incremental signal will be also simply called an incremental signal.

FIG. 6A shows an example of the absolute signal, FIG. 6B shows an example of the middle signal, and FIG. 6C shows an example of the incremental signal. In FIGS. 6A to 6C, the horizontal axis indicates the position "x" corresponding to a mechanical angle (angle $\theta$), and the vertical axis indicates the electric angle $\phi$ in each of the signals. The electric angles of the absolute signal, the middle signal, and the incremental signals will be also called $\phi_A$, $\phi_B$, and $\phi_C$, respectively.

FIG. 6A shows an example that when the position "x" moves in the entire measurement range, the electric angle $\phi_A$ of the absolute signal changes by 360°, that is, monotonously increases once.

FIG. 6B shows an example that when the position "x" moves in the entire measurement range, the electric angle $\phi_B$ of the middle signal changes by 360° four times, that is, an example of a repetition of monotone increase of four times.

FIG. 6C shows an example that when the position "x" moves in the entire measurement range, the electric angle $\phi_C$ of the incremental signal changes by 360° 16 times, that is, an example of a repetition of monotone increase of 16 times.

That is, it means that the middle signal and the incremental signal have position resolutions four times as high as those of the absolute signal and the middle signal, respectively.

In the case where the pitches are set to "$p_{G1}=2 \times p_L = p_{G2}$" like in the embodiment, the numbers $n_A$, $n_B$, and $n_C$ of slits repeated in the measurement axis Z direction in the tracks TA, TB, and TC are set to 1, 4, and 16, respectively, to realize such resolutions. However, those cases are just an example. The numbers $n_A$, $n_B$, and $n_C$ of slits in the tracks TA, TB, and TC are not limited but may be properly set according to desired numbers $m_A$, $m_B$, and $m_C$ of cycles required for the period signals obtained, respectively. In the case where the pitches are set to "$p_{G1}=2 \times p_L = p_{G2}$" as in the embodiment, "$m_A=n_A$, $m_A=n_A$, and $m_A=n_A$". In the case where the pitches are set to "$p_{G1}=1 \times p_L = p_{G2}$", "$m_A=2 \times n_A$, $m_A=2 \times n_A$, and $m_A=2 \times n_A$". From those relations, the numbers $n_A$, $n_B$, and $n_C$ of slits according to the desired numbers $m_A$, $m_B$, and $m_C$ of cycles can be determined.

Although FIGS. 6A, 6B, and 6C show signals which linearly monotonically increase, the position data generator 140 may output signals, for example, which monotonically increase step by step as the absolute signal, the middle signal, and the incremental signal. The stair width in the position x direction has desirably a length corresponding to the period of a signal whose resolution corresponds to the period of a signal whose resolution is higher by one.

The position data generator 140 generates the absolute signal, the middle signal, and the incremental signal as described above and specifies the absolute position "x" of the mobile body 201 based on those signals.

More concretely, in the examples shown in FIGS. 6A to 6C, the position data generator 140 first specifies the positions every quarter of measurement range length R in the entire measurement range from the absolute signal.

Next, the position data generator 140 specifies the positions every (R/4)/4 in the range having a length R/4 by using the middle signal.

Finally, the position data generator 140 specifies positions every (R/16)/4 in the range having a length (R/16) by using the incremental signal.

As a result, the position data generator 140 can specify the absolute position "x" of the mobile body 201 at resolution similar to that of the incremental detecting mechanism having the large number "m" of cycles. The position data generator 140 outputs position data expressing the absolute position "x" specified in such a manner to the controller 200.

Without performing such a process, the position data generator 140 may store a table of the absolute positions "x" corresponding to combinations with the absolute signal, the middle signal, and the incremental signal and specify the absolute position "x" by using the table. Obviously, the process of the position data generator 140 described above may be performed by the controller 20. In this case, the position data generator 140 may output, as position data, the absolute signal and the period signals each having a sine wave shape or the absolute signal and period signals each monotonically increasing after a process of multiplying process or the like to the controller 20.

1-3 Operation of Linear Motor System According to First Embodiment

Next, the operation of the motor system 1 according to the embodiment will be described. Since the operation, action, and the like of the components have been described above, their description will not be repeated.

The controller 20 obtains a high-order control signal from a high-order control apparatus or the like and, further, obtains position data indicative of the absolute position "x" of the mobile body 201 from the encoder 100. The controller 20 generates a control signal based on a high-order control signal and the position data and outputs it to the motor unit 200.

As a result, the motor unit 200 generates power based on the control signal and moves the mobile body 201. The moving unit 130 coupled to the mobile body 201 moves, and a plurality of index scales 120 of the moving unit 130 move relative to the main scale 110. As a result, the detectors 131A to 131C detect period signals in accordance with the relative movement of the index scale 120 relative to the main scale 110 and output them to the position data generator 140. The position data generator 140 generates position data based on the obtained signals and outputs it to the controller 20.

As described above, the encoder 100 according to the embodiment can detect the high-precision absolute position "x" of the mobile body 201 and supply it as position data to the controller 20. Therefore, based on the high-precision absolute position "x", the motor system 1 can control the position "x" of the mobile body 201 with high precision.

1-4 Method of Manufacturing Linear Encoder According to First Embodiment

The linear motor system according to the first embodiment has been described above.

Next, referring to FIG. 7, a method of manufacturing the encoder 100 according to the embodiment will be described. FIG. 7 is a diagram for explaining a method of manufacturing the linear encoder according to the embodiment.

As shown in FIG. 7, in the method of manufacturing the encoder 100, a process in step S101 is performed. In step S101 (an example of a step of determining the number of slits), the number "m" of cycles of a desired period signal to be obtained when the mobile body 201 moves through the entire measurement range is determined according to resolution desired to be obtained from one track T in the main scale 110. According to the period, the number "n" of slits to be formed in the track T is set. The flow advances to step S103.

In step S103 (an example of a step of setting inclined angle), the inclination angle θ is set so that the pitch $p_L$ of the slits SL becomes a desired value. For example, in the case of perpendicular slits like in the track TC, in step S105, the inclination angle $θ_C$ is set to zero (it means that the slits are not inclined).

In step S103, the inclination angle θ is set so that the pitch $p_L$ of the slits SL in the track T (an example of one track) to be formed becomes equal to the pitch $p_L$ of the slits SL in the track T (an example of another track T) already formed or to be formed subsequently. After the process in step S103, the flow advances to step S105.

In step S105 (an example of slit forming step), the plurality of slits SL having a predetermined width w are arranged in parallel in the track T at the constant pitches $p_L$ and at the inclination angle θ which is set in step S103. The flow advances to step S107.

In step S107, whether the slits SL are formed in all of the desired plurality of tracks T or not is determined. When there is a track T in which the slits SL are not formed yet, the processes after step S101 are repeated. On the other hand, when all of the slits SL are formed, the flow advances to step S109.

In step S109 (an example of a step of disposing an index scale), for two or more tracks T in which at least the pitches $p_L$ are equal, the detector 131 including the index scale 120 is disposed so that the gaps "g" between the main grating L and the index gratings G1 and G2 become equal.

Simultaneously with or before or after those processes, a process of disposing the detector 131 in the moving unit 130, a process of coupling the detectors 131 and the position data generator 140, a process of housing the components in a case and supporting them fixedly or movably, and the like are performed, thereby completing the encoder 100. The detailed description of the processes will not be given here.

1-5 Example of Effect Produced by Linear Encoder System According to First Embodiment The linear encoder, the linear motor, the linear motor system, the main scale, and the method of manufacturing the linear encoder according to the first embodiment of the invention have been described above.

In the encoder 100 or the like according to the embodiment, a plurality of slits SL in at least one track T are formed as inclined slits whose longitudinal direction corresponds to a direction inclined from the perpendicular axis Z direction by the inclination angle θ. In the inclination slits, by adjusting the inclination angle θ, the pitch $p_L$ can be adjusted without changing the number "n" of slits disposed in the measurement axis Z direction of the track T. Therefore, the degree of freedom in designing, development, and the like can be increased.

In the case of forming the absolute encoder while using the diffraction interference optical system as described above, a plurality of tracks T having different numbers "m" of cycles of period signals obtained are necessary. The number "n" of slits in each track T corresponds to the number "m" of cycles. To obtain a relatively low number "m" of cycles, the number "n" of slits is set to a relatively small number. However, in the case of using no inclined slits as in the embodiment, when the number "n" of slits is set to a relatively small value, the pitch $p_L$ becomes high, and it becomes difficult to form the diffraction interference optical system. Even if the diffraction interference optical system can be formed, without using the inclined slits, the numbers "n" of slits in the tracks T are different from each other, and the pitches $p_L$ in the tracks T are accordingly different from each other. As a result, the gap "g" optimum for the pitch $p_L$ in each track T also varies among the tracks T, and designing, development, manufacture, and the like are necessary for each diffraction interference optical system.

On the other hand, in the encoder 100 according to the embodiment, by adjusting the inclination angle θ of each track T, the pitch $p_L$ can be adjusted. Therefore, the pitches $p_L$ in all of the tracks T can be set relatively small to a degree that the diffraction interference optical system can be formed. When the inclination angle θ is properly adjusted, the pitches $p_L$ in the plurality of tracks T can be set to the same value, so that the gaps "g" proper to the plurality of tracks T can be set to the same value. Therefore, diffraction interference optical systems constructed by the plurality of tracks T can be similarly designed, developed, and manufactured. The gaps "g" for the plurality of tracks T can be also simultaneously adjusted.

Therefore, in the encoder 100 according the embodiment, by using the diffraction interference light, while improving detection precision, restriction and the like at the time of designing and development at the time of constructing a diffraction interference optical system are reduced, and designing, development, and the like can be performed so as to facilitate manufacture.

2 Second Embodiment

The linear motor system according to the first embodiment of the invention has been described above.

Next, with reference to FIG. 8, a linear motor system according to a second embodiment of the invention will be described. FIG. 8 is a diagram for explaining the configuration of a main scale of a linear encoder according to the second embodiment of the invention.

In the first embodiment of the invention, the case where the directions of inclinations (inclination directions) of the slits SLA and SLB in the tracks TA and TB formed as inclined slits are the same as that of the measurement axis X as shown in FIG. 3 has been described. That is, the case where both of the inclination angles $\theta_A$ and $\theta_B$ are positive has been described. The invention, however, is not limited to the case. The inclination directions of adjacent tracks from the perpendicular axis Z direction can be set opposite to each other. As the second embodiment of the invention, the case where the inclination directions of adjacent tracks are set opposite to each other will be described. Since the encoder according to the embodiment and the like can be constructed in a manner similar to the first embodiment except that the inclination directions of tracks are set opposite to each other, the differences from the first embodiment will be mainly described here.

As shown in FIG. 8, a main scale 310 of the encoder of the embodiment has a main grating LD in place of the main grating LA shown in FIG. 3 in the track TA (an example of at least one track). The main grating LD has a plurality of slits SLD.

Different from the slit SLA shown in FIG. 3, the inclination direction of the slit SLD is set in the direction opposite to that of the slit SLB in the adjacent track TB (an example of another track). Specifically, the slit SLB is formed in a direction obtained by turning the perpendicular axis Z direction clockwise using the normal axis Y as a rotation axis. On the other hand, the slit SLD is formed in a direction obtained by turning the perpendicular axis Z direction counterclockwise using the normal axis Y as a rotation axis. That is, the inclination angle $\theta_B$ is positive and the inclination angle $\theta_D$ is negative. The magnitude of the inclination angle $\theta_D$ is set in a manner similar to the first embodiment. When the number of slits is $n_D = n_A$, $|\theta_D| = |\theta_A|$ is satisfied.

On the other hand, diffraction interference light generated from the slits SL forms an interference pattern which repeats in a direction almost at a right angle with respect to the longitudinal direction of each of the slits SL. In contrast, when the longitudinal direction of the inclined slits SL is inclined, it becomes closer from the width direction (perpendicular axis Z direction) of the main scale to the longitudinal direction (measurement axis X direction). Therefore, there is a case that the interference pattern is formed so as to repeat in the direction of an adjacent track. As a result, it is feared that a crosstalk occurs between the interference pattern and the diffraction interference optical system of an adjacent track. To prevent such a crosstalk, designing and development of the encoder may be restricted.

In such a case, by setting the inclination directions of the slits SLD and SLB in the adjacent tracks TA and TB in directions opposite to each other as in the embodiment, the direction of formation of the interference pattern can be changed, and designing and development which prevents occurrence of a crosstalk can be easily performed.

Obviously, also in the second embodiment, other special action, effect, and the like produced in the first embodiment can be produced.

Obviously, numerous modifications and variations of the present invention are possible in light of the above teachings. It is therefore to be understood that within the scope of the appended claims, the invention may be practiced otherwise than as specifically described herein.

For example, in all of the foregoing embodiments, the case of obtaining a plurality of period signals for forming an absolute encoder by using a diffraction interference optical system has been described. However, the invention is not limited to the case. Obviously, the invention can be also applied to an encoder which obtains at least two period signals from a diffraction interference optical system and obtains other period signals by using, for example, an optical or magnetic detector of a geometric optics system. In this case as well, it is desirable to obtain the incremental signal (having the largest number "m" of cycles) from a diffraction interference optical system.

In the specification, the steps written in the flowcharts include processes which are performed time-sequentially along the written order and also processes which are not necessarily performed time-sequentially but performed in parallel or individually. Obviously, the steps processed time-sequentially may be processed in different orders in some cases.

What is claimed is:

1. A linear encoder comprising:
   a main scale having two or more band-shaped tracks in each of which an optical main grating is formed so that its longitudinal direction corresponds to a measurement axis direction; and
   an index scale opposed to the main scale so as to form a diffraction interference optical system in cooperation with the main grating, disposed so as to be movable relative to the main scale in the measurement axis direction, and in which two or more optical index gratings are formed,
   wherein a plurality of slits included in the main grating in at least one track are formed so as to be inclined at a predetermined inclination angle from a direction perpendicular to the measurement axis direction so that pitch of the slits in the track becomes equal to the pitch of the slits in at least one other track.

2. The linear encoder according to claim 1, wherein a gap between a main grating in the at least one track and the at least one index grating corresponding to the main grating is equal to a gap between a main grating in the other tracks and the at least one index grating corresponding to the main grating.

3. The linear encoder according to claim 1, wherein the inclination angle in slits in the at least one track is different from the inclination angle in slits in the other tracks.

4. The linear encoder according to claim 1, wherein an inclination direction in the slits in the at least one track is opposite to an inclination direction in slits in the other track adjacent to the track.

5. The linear encoder according to claim 1, wherein a plurality of slits included in a main grating in the track are reflection slits, and
the two index gratings corresponding to the one main grating are disposed on an identical face side of the main scale.

6. A linear motor system comprising:
a motor unit that moves a mobile body along a guide rail;
a linear encoder that measures a position of the mobile body in a measurement axis direction in which the guide rail is extended; and
a controller that controls the motor unit based on the position detected by the linear encoder,
wherein the linear encoder includes:
a main scale disposed along the guide rail and having two or more band-shaped tracks in each of which an optical main grating is formed so that a longitudinal direction of the tracks corresponds to the measurement axis direction; and
an index scale opposed to the main scale so as to form a diffraction interference optical system in cooperation with the main grating, disposed in the mobile body so as to be movable relative to the main scale in the measurement axis direction, and in which two or more optical index gratings are formed, and
a plurality of slits included in the main grating in the at least one track are formed so as to be inclined at a predetermined inclination angle from a direction perpendicular to the measurement axis direction so that pitch of the slits in the track becomes equal to the pitch of the slits in at least one other track.

* * * * *